Figure 1:
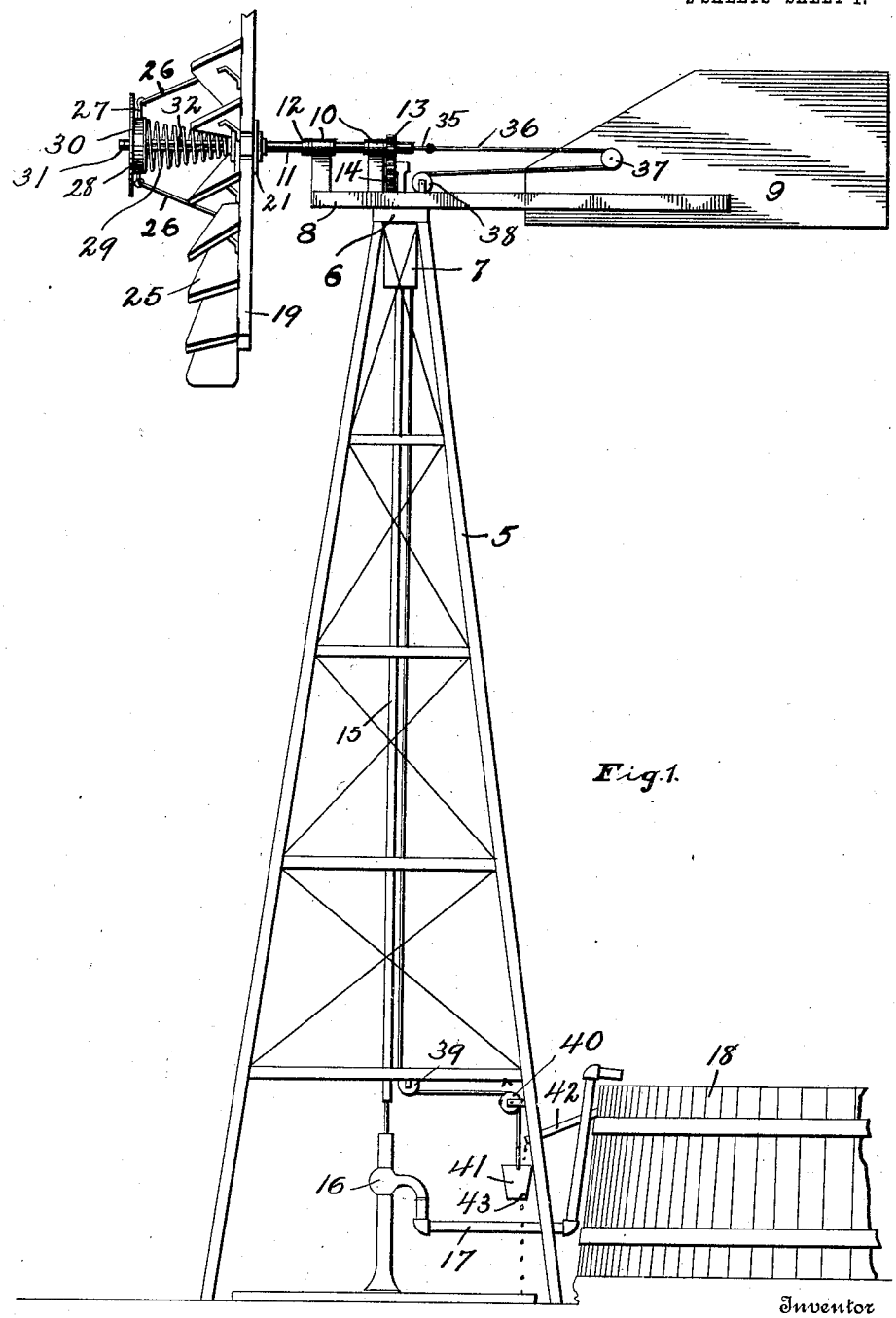

No. 890,893. PATENTED JUNE 16, 1908.
E. EGGLESTON.
WIND DRIVEN PUMP.
APPLICATION FILED MAY 1, 1907.

2 SHEETS—SHEET 1.

Witnesses
Carl Stoughton
Frank G. Campbell

Inventor
Eugene Eggleston
By Chester C. Shepherd
Attorney

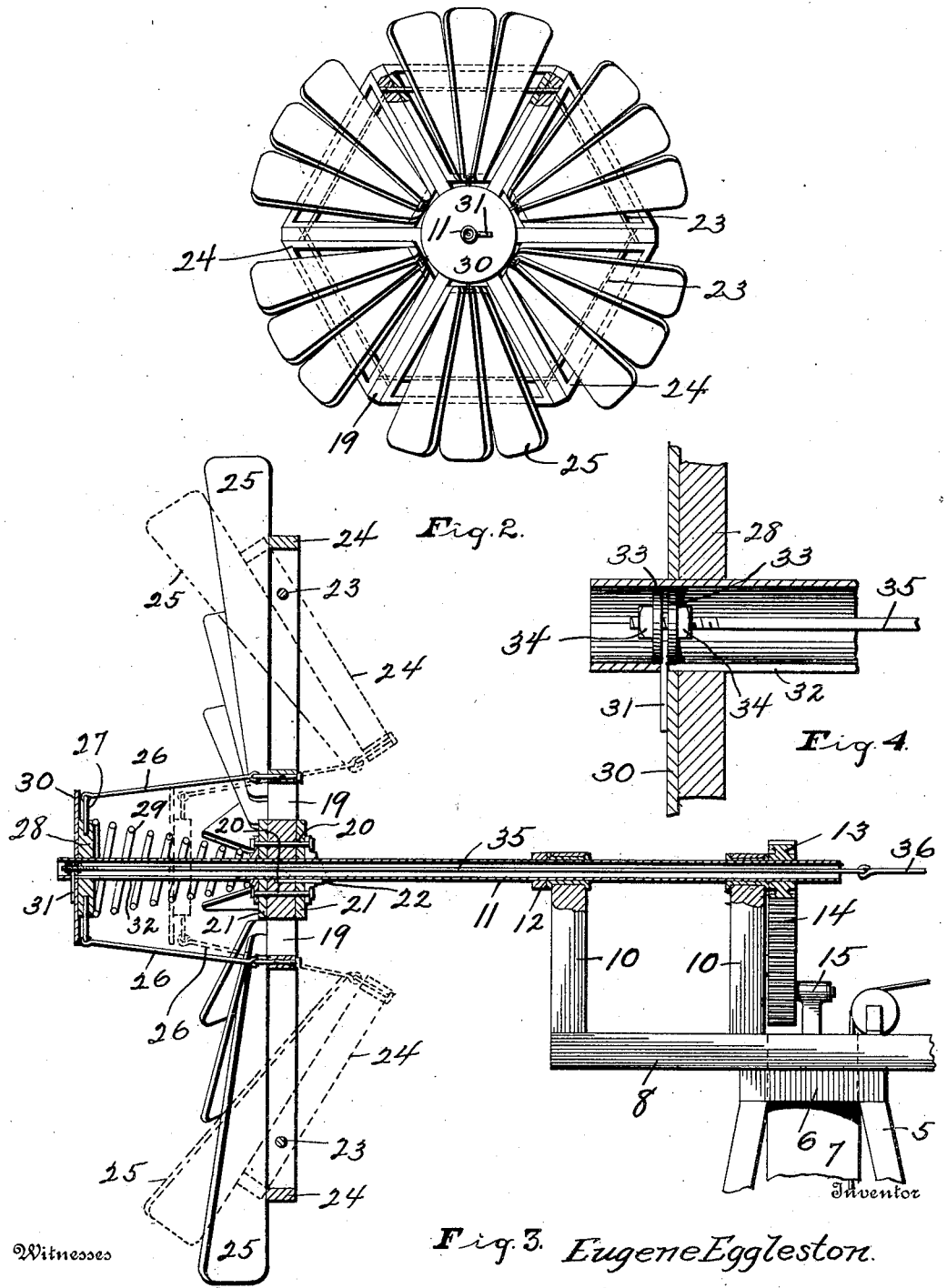

UNITED STATES PATENT OFFICE.

EUGENE EGGLESTON, OF COLUMBUS, OHIO.

WIND-DRIVEN PUMP.

No. 890,893.  Specification of Letters Patent.  Patented June 16, 1908.

Application filed May 1, 1907. Serial No. 371,262.

*To all whom it may concern:*

Be it known that I, EUGENE EGGLESTON, citizen of the United States, residing at Columbus, in the county of Franklin and State of Ohio, have invented certain new and useful Improvements in Wind-Driven Pumps, of which the following is a specification.

My invention relates to wind driven pumps and has for its object the provision of a device of this character comprising a pump and wind mill for driving said pump, and means for automatically stopping said wind mill when a tank to which the pump supplies water, has been filled.

A further object of the invention is the provision of a wind mill constructed in such manner that when the wind reaches a predetermined velocity, the blades of the fan will be tilted in such manner that the blades will present a much reduced area to the action of the wind.

Further objects and advantages of the invention will be set forth in the detailed description which now follows.

In the accompanying drawings: Figure 1 is a side elevation of a wind driven pump constructed in accordance with the invention, Fig. 2 is a front elevation of the wind wheel, Fig. 3 is a vertical section through a portion of the wind mill, and, Fig. 4 is a detail sectional view of a connection between an actuating rod and a disk hereinafter described.

Like numerals designate corresponding parts in all of the figures of the drawing.

Referring to the drawing, the numeral 5 designates a tower, which may be of any desired construction. At its upper end this tower is provided with a platform 6. A sleeve 7 which is carried by a swinging table 8, extends through the platform 6 and pivotally mounts the table 8 with relation to the tower. Secured to the swinging table 8 is a rudder vane 9. Mounted in bearings 10 which are carried by the table 8, is a hollow shaft 11 and it is upon this shaft that the wind wheel hereinafter described, is secured. A collar 12 secured upon the shaft 11, prevents endwise movement of said shaft in one direction, while a pinion 13 also secured upon said shaft, prevents endwise movement of the shaft in the opposite direction. This pinion 13 meshes with a gear wheel 14 and it is to this gear wheel 14 that the pump rod 15 is connected. This pump rod is a portion of a pump 16, the parts so far described being of the usual and well known construction.

A discharge pipe 17 leads from the pump 16 and is adapted to discharge into a tank 18. Radial arms 19 are secured to the shaft 11 by means of bolts 20 and plates 21, the bolts 20 serving to clamp the radial arms 19 between the plates, as will be readily understood. A key 22 causes these radial arms to turn with the shaft 11. Pivoted between these radial arms upon bolts 23 are triangular frames 24, these triangular frames carrying the blades or vanes 25 of the wind wheel. Connected to the inner ends of these triangular frames are links 26, said links being in turn connected to pins 27 which are carried by a plate 28. This plate is normally forced away from the body of the wind wheel by a spiral spring 29 which bears between said plate and the wind wheel. A disk 30 lies between the plate 28 and a pin 31, said pin being slidably disposed in a slot 32 of the shaft 11 and the inner end of said pin entering between disks 33 which are secured by nuts 34 (see Fig. 4) upon a rod 35, said rod passing through the hollow shaft 11. The end of this rod is connected to a flexible member 36, such as a cord, said flexible member passing through a pulley 37 which is carried by the rudder vane 9, then over a pulley 38 which is carried by the swinging table 8, through the sleeve 7, over pulleys 39 and 40 and is secured at its lower end to a pail or bucket 41. An overflow pipe 42 from the tank, overlies this pail and said pail is provided with a very small outlet or drip opening 43.

The operation of the device is as follows: When the wind is of ordinary velocity, the triangular frames are held in a substantially vertical position by the spring 29 pressing outwardly upon the plate 28 and disk 30, since the rods 26 connect the plate 28 with these triangular frames. At this time the blades or vanes 25, present their most effective working surfaces to the wind and the wheel is caused to revolve and to pump water to the tank 18 through the connections described. If, however, the wind reaches an excessive velocity, its pressure upon the disk 30 will move said disk and consequently the plate 28 to the right in Fig. 3, this movement being against the tension of the spring 29. This rocks the triangular frames 24 to the dotted line positions illustrated in Fig. 3 and consequently moves the blades to such an angle that they no longer present an effective working surface to the wind and the wheel is brought to a stand-still, or if it revolves at all, its revolution will be very slow. As to whether it shall be permitted to revolve at all, may be readily determined by the tension or resistance of the spring 29. If, however, the wind remains at ordinary working velocity and the tank 18 be filled, the water through the overflow pipe 42 will fill the pail 41, whereupon the weight of said pail will through the flexible connection 36, draw the rod 35 to the right in Fig. 3 and tilt the triangular frames to such position as to bring the wind wheel and consequently the pump to a stand-still. As the water is used from the tank 18 and water ceases to flow through the overflow pipe 42 to the pail 41, said pail will be gradually emptied through the drip opening 43. When this pail has been sufficiently emptied, the spring 29 will throw the plate 28 to the left in Fig. 3 and will consequently move the triangular frames to such position that the blades will again present an effective working surface to the wind and the pump will be again set in motion.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is:

In a device of the character described, the combination with a supporting tower, of a swinging platform mounted upon said tower, a hollow shaft rotatably mounted upon said platform, a plurality of radial arms secured to said hollow shaft, a tilting frame located between each pair of said radial arms, a plurality of vanes fixedly secured to said tilting frames, a wind disk slidably mounted upon the hollow shaft, connections between said wind disk and said vanes, a spring which normally forces said disk into such position as to hold the vanes into the wind, a rudder vane carried by said swinging platform, a pump, driving connections between said pump and the hollow shaft, a rod which passes through the hollow shaft and is connected to the wind disk, a pulley mounted upon the rudder vane, a second pulley mounted adjacent the central portion of the swinging platform, a flexible connection which is connected to the rod and passes first over the pulley of the rudder vane, then over the pulley that is mounted upon the tilting platform and then passes downwardly through said tower, a receptacle secured to the lower end of the flexible member, a receptacle into which the pump is adapted to discharge, and an overflow pipe leading from this last named receptacle and discharging into the first named receptacle.

In testimony whereof I affix my signature in presence of two witnesses.

EUGENE EGGLESTON.

Witnesses:
FRANK G. CAMPBELL,
A. L. PHELPS.